United States Patent
Aller et al.

(10) Patent No.: US 11,704,767 B2
(45) Date of Patent: Jul. 18, 2023

(54) TEXTURE EXTRACTION

(71) Applicant: Spot Vision LLC, Portland, OR (US)

(72) Inventors: Joshua Victor Aller, Portland, OR (US); Nicholas Riehl, Portland, OR (US)

(73) Assignee: Spot Vision LLC, Portland, OR (US)

( * ) Notice: Subject to any disclaimer, the term of this patent is extended or adjusted under 35 U.S.C. 154(b) by 92 days.

(21) Appl. No.: 17/389,231

(22) Filed: Jul. 29, 2021

(65) Prior Publication Data

US 2022/0036503 A1     Feb. 3, 2022

Related U.S. Application Data

(60) Provisional application No. 63/059,338, filed on Jul. 31, 2020.

(51) Int. Cl.
| | |
|---|---|
| *G06T 3/00* | (2006.01) |
| *G06N 3/04* | (2023.01) |
| *G06N 3/08* | (2023.01) |
| *G06T 3/40* | (2006.01) |
| *G06F 18/214* | (2023.01) |

(52) U.S. Cl.
CPC ............ *G06T 3/0031* (2013.01); *G06N 3/04* (2013.01); *G06N 3/08* (2013.01); *G06F 18/214* (2023.01); *G06T 3/4046* (2013.01)

(58) Field of Classification Search
CPC ....... G06T 3/0031; G06T 3/4046; G06N 3/04; G06N 3/08; G06F 18/214
See application file for complete search history.

(56) References Cited

U.S. PATENT DOCUMENTS

| | | | | |
|---|---|---|---|---|
| 5,450,531 | A * | 9/1995 | Ng | G06K 15/1874 358/448 |
| 5,568,571 | A * | 10/1996 | Willis | G06V 30/162 382/176 |
| 5,682,441 | A * | 10/1997 | Ligtenberg | H04N 19/30 707/E17.031 |
| 5,781,666 | A * | 7/1998 | Ishizawa | G06T 1/20 382/284 |
| 5,982,373 | A * | 11/1999 | Inman | G06T 3/403 345/419 |
| 6,278,459 | B1 * | 8/2001 | Malzbender | G06T 15/50 345/424 |
| 6,307,959 | B1 * | 10/2001 | Mandelbaum | G06T 7/55 382/104 |
| 6,549,210 | B1 * | 4/2003 | Van Hook | G06T 15/04 711/2 |
| 7,480,394 | B2 * | 1/2009 | Berlin | B07C 3/14 382/101 |
| 7,565,028 | B2 * | 7/2009 | Saed | G06T 5/007 382/284 |
| 7,636,393 | B2 * | 12/2009 | Kanamori | H04N 25/443 375/240.26 |
| 7,889,209 | B2 * | 2/2011 | Berger | G06T 15/04 715/848 |
| 8,249,370 | B2 * | 8/2012 | Kanamori | H04N 19/63 375/240.12 |

(Continued)

FOREIGN PATENT DOCUMENTS

WO    WO-2013033442 A1 *   3/2013    ......... G06K 9/00201

*Primary Examiner* — Manav Seth
(74) *Attorney, Agent, or Firm* — Elliott, Ostrander & Preston, P.C.

(57) ABSTRACT

Texture extraction is disclosed.

18 Claims, 3 Drawing Sheets

(56) References Cited

U.S. PATENT DOCUMENTS

| | | | | |
|---|---|---|---|---|
| 9,107,634 | B2* | 8/2015 | Inoue | A61B 8/54 |
| 10,109,043 | B2* | 10/2018 | Kiyota | H04N 7/181 |
| 10,289,935 | B2* | 5/2019 | Zia | G06V 10/82 |
| 10,572,995 | B2* | 2/2020 | Inoue | G01N 21/95607 |
| 10,595,979 | B2* | 3/2020 | Bayat | G03F 7/0037 |
| RE49,387 | E * | 1/2023 | Hoffberg | H04N 21/454 |
| 11,595,626 | B2* | 2/2023 | Emig | G06T 3/0093 |
| 11,599,968 | B2* | 3/2023 | Schwarz | G06T 3/4007 |
| 11,601,383 | B1* | 3/2023 | Nipane | H04L 45/586 |
| 2021/0124969 | A1* | 4/2021 | Aller | G06N 3/08 |
| 2021/0342984 | A1* | 11/2021 | Lin | G06T 5/50 |

\* cited by examiner

TEXTURE EXTRACTION

RELATED APPLICATIONS

This application claims priority to the provisional application of the same title, filed on Jul. 31, 2020, and assigned application No. 63/059,338. This application further incorporates U.S. Pat. No. 8,422,777, "Target and method of detecting, identifying, and determining 3-D pose of the target" by reference.

The present disclosure is written with the presumption that the reader is skilled in the arts of 3-D computer graphics, texture mapping, data science and photogrammetry.

BACKGROUND

We live in a world that is full of printed media. Text, images, and digital codes are ubiquitous in our modern lives.

Two-dimensional media is often affixed to packaging for products, pill bottles, as well as flat surfaces for ID cards, signage, etc. For other media, such as magazines and brochures, the media is printed on a malleable surface in order to be more easily handled by humans, resulting in a curved surface when handled.

Humans are easily able to process the distortions introduced by 3-D perspective, and the mapping of 2-D information onto 3-D curved surfaces. While it is trivial for humans to read text or interpret an image on a curved surface this task can be difficult for computers.

A typical computer device today can be a mobile phone, such as an iPhone or Android, or an autonomous vehicle, drone, etc. Algorithms to read information (for example Optical Character Recognition (OCR), or watermark detection) often encounter problems reading information from curved packaging or at off-angles because of the distortions introduced.

DETAILED DESCRIPTION

Figure 1:
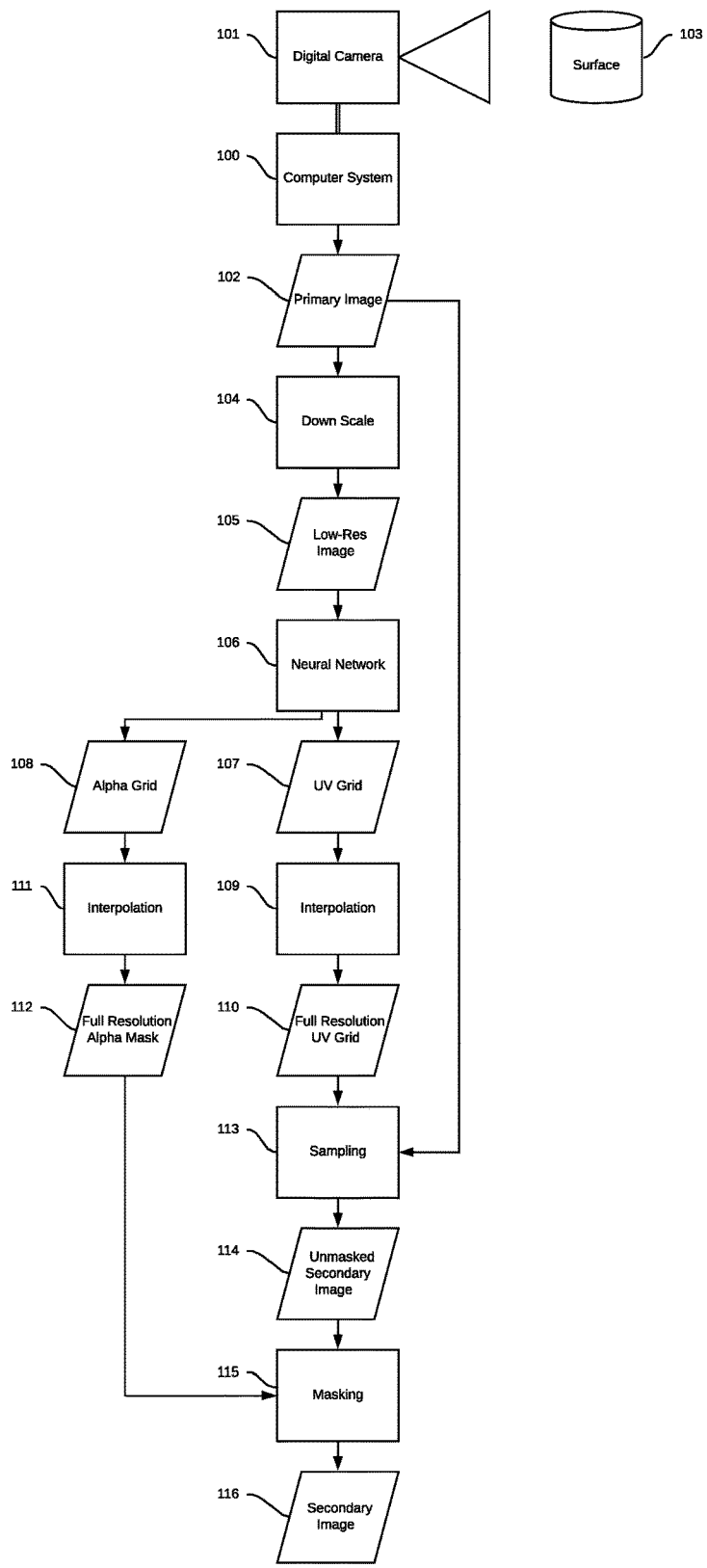
FIG. 1 is a flowchart of how a system converts a primary image into a secondary image.

We describes a method which reads a primary image, such as from curved packaging or at off-angles, and processes the image to produce a secondary image in which the distortions are minimized. This secondary image can more easily be read by OCR and code reading algorithms.

Textures

Information is often printed on 2-D labels and affixed to packaging. Alternatively, information can be printed onto the packaging material itself. The 2-D label may contain human readable text, photographs, artwork, barcodes or other 2-D fiducial markers, or hidden information such as stenographic digital watermarks, etc.

We call the image of the undistorted 2-D information a texture. A texture can be represented on a computer as a 2-D raster image: an array of RGB color values each associated with a pixel. These color values can be interpolated with bilinear or bicubic interpolation between pixels to produce a continuous function mapped by parameters u and v. With this interpolation, the texture can then be evaluated as a continuous function:

color=texture(u,v)

Texture values, with ordered pairs of u and v, typically range from (−1,−1) to (1,1). All values inside this range are part of the texture image.

Parametric Surfaces

A parametric surface is a surface in 3-D space that is mathematically formulated as a function of two parameters, for example, u,v. These parameters may be either bounded, or unbounded; cyclical or non-cyclical.

For example, a planar rectangle based on u,v parameterization is modeled as follows:

x=u
y=v
z=0

For example, a cylinder based on u,v parameterization is modeled as follows:

x=cosine(u*Pi)
y=v
z=sine(v*Pi)

These 3-D parameterized surfaces are constructed in a model coordinate system, and can be transformed to a world coordinate system by use of a transformation matrix which is generated from pose parameters.

Other examples of parametric surfaces include b-spline and bezier surfaces, ellipsoids, parabolic surfaces, composite surfaces, and scanned point cloud surfaces.

UV Mapping Grid

The UV mapping grid is a two-dimensional matrix of u,v texture coordinates. The u,v texture values are used to reference the source image, producing a rectified image through the process of texture mapping.

UV mapping grids may be interpolated, through techniques such as linear or bicubic interpolation, in order to rectify images that are at a higher resolution than the neural network uv grid output.

Neural Network

The neural network is a mathematical function that takes in an image of fixed resolution as its input, and outputs a grid of two dimensional coordinates that map where the color should be sampled in the original image in order to produce an undistorted image.

A ResNet network, for example, is trained with images of packaging, text, ID card, or other media on surfaces with known orientations and shape. By using a gradient descent solver with methods described in the present disclosure, a practitioner can train such a network to determine the two dimensional UV mapping grid necessary to undistort a variety of images.

Primary Image

A primary image is a raster image of a three dimensional scene, either captured by a camera system or synthesized using computer graphics techniques, which contains at least one surface with a texture. For example, a photograph of a can of food wrapped with an informational label (texture).

Secondary Image

A secondary image is a raster image which contains the flattened and rectified texture or label extracted from a primary image by the methods of the present disclosure.

Alpha Image

An alpha image, matte image, or alpha mask is a single channel (monochrome) image that indicates what part of a primary or secondary image should be masked out during a masking or compositing operation.

Coordinate Systems and Spaces

The following two and three dimensional spaces are referenced in this document:

"Image Space" is a 2-D cartesian space which maps a continuous interpolation of a raster image.

"Parameter Space" is a 2-D space in which coordinates map to points on the 3-D model surface. Parameter space can be converted to model space 3-D coordinates via evaluation of the parametric surface.

"Model Space" is a 3-D space in which a parametric surface is constructed. Parametric models are centered on the origin, and typically aligned with model space axes for convenience. Points in model space can be converted to camera space (and vice-versa) by multiplication with the pose matrix (or inverse pose matrix).

"Camera Space" is a 3-D space in which the camera is at the origin of cartesian space with the viewing direction along the negative z-axis. Using a camera projection model, points in camera space can be converted to image space, and using inverse projection, points in image space can be converted to rays in camera space.

Pose Matrix Construction

A 3-D pose is generally fully described with six degrees of freedom: Rotate-X, Rotate-Y, Rotate-Z, Translate-X, Translate-Y, Translate-Z.

Pose parameters may be converted to a 4×4 pose matrix (as typical in computer graphics).

Camera (Lens) Projection

Camera model and intrinsic parameters define the mathematical function of projection from 3-D camera space to 2-D image space.

For an idealized camera, projection can be simplified to:

image_x=camera_x/camera_z
image_y=camera_y/camera_z

Ray projection is the pseudo-inverse of lens projection, translating from 2-D image space to 3-D camera space (at a unit z-depth).

Overview of System

The methods in the present disclosure include a system which uses a computer to convert a primary image of a texture applied to a 3D surface into a secondary image containing the flattened and rectified texture. FIG. 1 is a flowchart of how the system converts the primary image into a secondary image.

A computer system, smart phone, or other digital device 100 uses a digital camera 101 to capture a primary image 102 of a surface 103 in 3-dimensional space.

The primary image 102 is scaled down 104 to a fixed resolution image 105 that corresponds to the required input of a neural network 106. For example, a network based on ResNet would be scaled down to 224×224 resolution with three color channels (RGB).

The neural network 106 is a function that takes the primary image 102 as input, and produces as output a uv mapping grid 107 and alpha grid 108. The uv mapping grid is a N×N×2 tensor, where N is the resolution of the grid. The alpha grid 108 is an N×N×1 tensor.

Image interpolation 109, then scales the uv mapping grid 107 to a full resolution uv grid 110 using either linear or bicubic interpolation. Similarly, interpolation 111 scales the alpha grid 108 to a full resolution alpha image mask 112.

The primary image 102 is then sampled 113 using the full resolution uv grid 110 to produce the unmasked secondary image 114. This is done by applying each pixel's full resolution uv grid coordinate to interpolate the color at that coordinate of the source image.

Every pixel of the unmasked secondary image 114 is then multiplied 115 by the corresponding pixel in the full resolution alpha mask 112 to produce the secondary image 116.

Overview of Training

A component of this system is a neural network which can have a training process, the details of which are described herein.

The neural network is trained with a gradient descent method. Training is performed in batches, with each batch the network takes an input, produces an output, and a loss is calculated. The loss is minimized to train the system.

Figure 2:
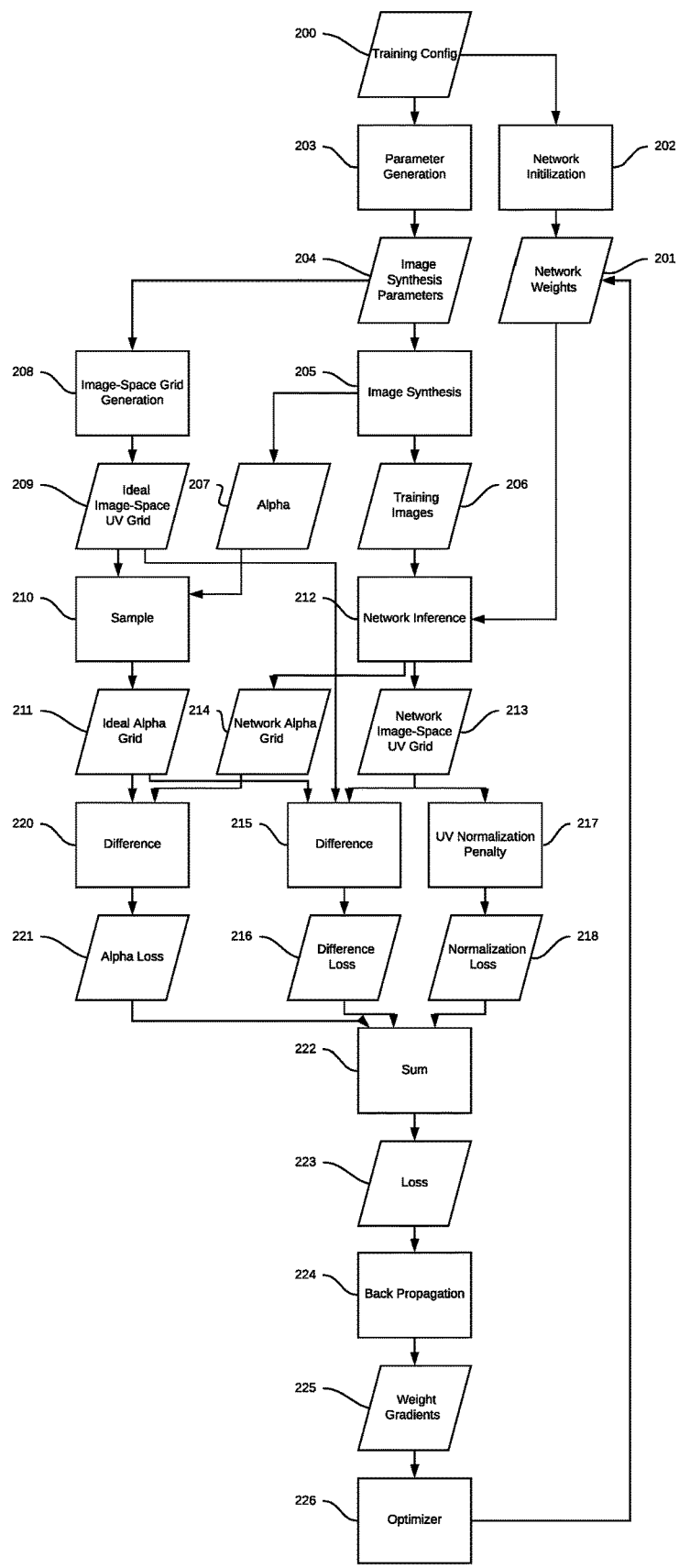
FIG. 2 is a flowchart of loss calculation for training a neural network to generate a uv mapping grid.

FIG. 2 is a flowchart of how the neural network used in this system is trained, and specifically how the loss is calculated.

A configuration file 200 stores, on a computer system, a description of how images are synthesized for the purposes of training the neural network weights and biases 201.

The configuration file 200 indicates the range of selected image synthesis parameters 204. Each image in the batch has a different random selection of parameters from the specified ranges. An instance of image synthesis parameters is analogous to a "scene description" file used traditionally in the field of computer graphics, and we will also refer to "scene" as the collection of qualities that are used to create the image.

Each scene is composed of a surface with randomized shape and pose. A texture or "label", chosen randomly from a large set of images, is applied to the surface. The set of images used for textures provide the key features that are used to determine orientation and curvature. For example, by using a set of texture images containing text, the training will produce a system capable of keying off of text to recognize orientation and surface geometry. A random mask with irregular edges is applied to crop the surface in order to teach the system to recognize shapes that are only partially visible.

Initially, the configuration file 200 specifies how to perform network initialization 202. For example, the configuration file 200 might specify to create a Resnet34 network, or a MobileNet, and may specify random or gabor filters in initialization.

Subsequently, the configuration file 200 indicates the qualities and ranges of the synthetic images used to train the system through specifying the range of parameters for image synthesis inputs. The parameters describing the scene may include:

Size and shape of objects in the scene.
3-D Pose of objects in the scene.
Background images to place behind objects.
Texture label images to place on 3-D objects.
Masks to crop away parts of the label.
Mask 2-D placement (rotations, offset, scale)
Maps to model specular reflection on 3-D objects.
Camera intrinsic properties (field of view, distortion parameters, etc)
Camera motion (motion blur)
Focus blur
Random sensor noise
Degree of JPEG artifacts
Random color, gamma, and luminance shifts A parameter generator 203 creates random image synthesis parameters 204, within the ranges specified in the configuration file 200. As training is done in batches of multiple images, a batch of image synthesis parameters 204 is generated (one per image).

The batch of parameters 204 are used by the image synthesis 205 to render a batch of training images 206 and alpha images 207. The parameters 204 are also used by Image Space Grid Generation 208 to generate corresponding Ideal Image-Space UV grids 209.

The alpha images 207 are sampled 210 at locations specified by the ideal image-space uv grids 209 to produce an ideal alpha grid 211.

The neural network weights and biases 201 are used in network inference 212 with the batch of images 206 as input, and the output being a batch of network UV grids 213 and a network alpha mask 214.

The network UV grids 213 are compared with a difference operation 215, which finds the difference loss 216 between the ideal UV grids 209 with the network UV grids 213, within the region of the grid defined by the ideal alpha grids 211.

This difference loss per image can be expressed mathematically as:

$$\text{difference\_loss} = \text{Sum}\{((\text{ideal\_uv} - \text{network\_uv}) * \text{alpha})^2\},$$

where ideal_uv is the ideal image-space uv grid 209, network_uv is the network uv grid 213, and alpha is the ideal alpha grid 211. Ideal_uv and network_uv grids are represented as N×N×2 tensors, where N represents the resolution of the grid, and alpha is represented as a N×N×1 tensor with values between 0 and 1. (Asterisk in this operation represents element-wise multiplication.)

The network uv grid 213 is evaluated for a uv normalization penalty 217 to produce a normalization loss 218. The normalization penalty 217 is a function that returns zero for smooth surfaces, and values greater than zero for wrinkly, jittery, or bumpy surfaces.

A second-derivative gradient can be calculated for the network uv grid 213, indicating the amount of curvature of each grid location in uv parameter space. One example of a normalization penalty function is the difference of every grid uv coordinate second derivative from the average of its neighbors.

The ideal alpha grid 211 is compared to the network alpha grid 213 with a difference operation 220 to produce an alpha loss 221.

This alpha loss can be expressed mathematically as:

$$\text{alpha\_loss} = \text{Sum}\{(\text{ideal\_alpha} - \text{network\_alpha})^2\},$$

where ideal_alpha is the ideal alpha grid 211, and network_alpha is the network alpha grid 213.

The difference loss 216, normalization loss 218, and alpha loss 221 are summed 222 to produce training loss 223 for the batch.

Back propagation 224 relative to the training loss 223 is propagated through all operations in FIG. 2 producing weight gradient values 225 for the network weights and biases 201.

An optimizer 226, such as the stochastic gradient descent algorithm, or variants such as Adam, Adagrad, Ranger, applies the gradient values 225 to modify the network weights and biases 201.

The training process is iterative, and after a number of iterations, the neural network loss 223 will decrease to an acceptable value, and the neural network 201 will be deemed to be trained.

Details for UV Image-Space Grid Generation

Figure 3:
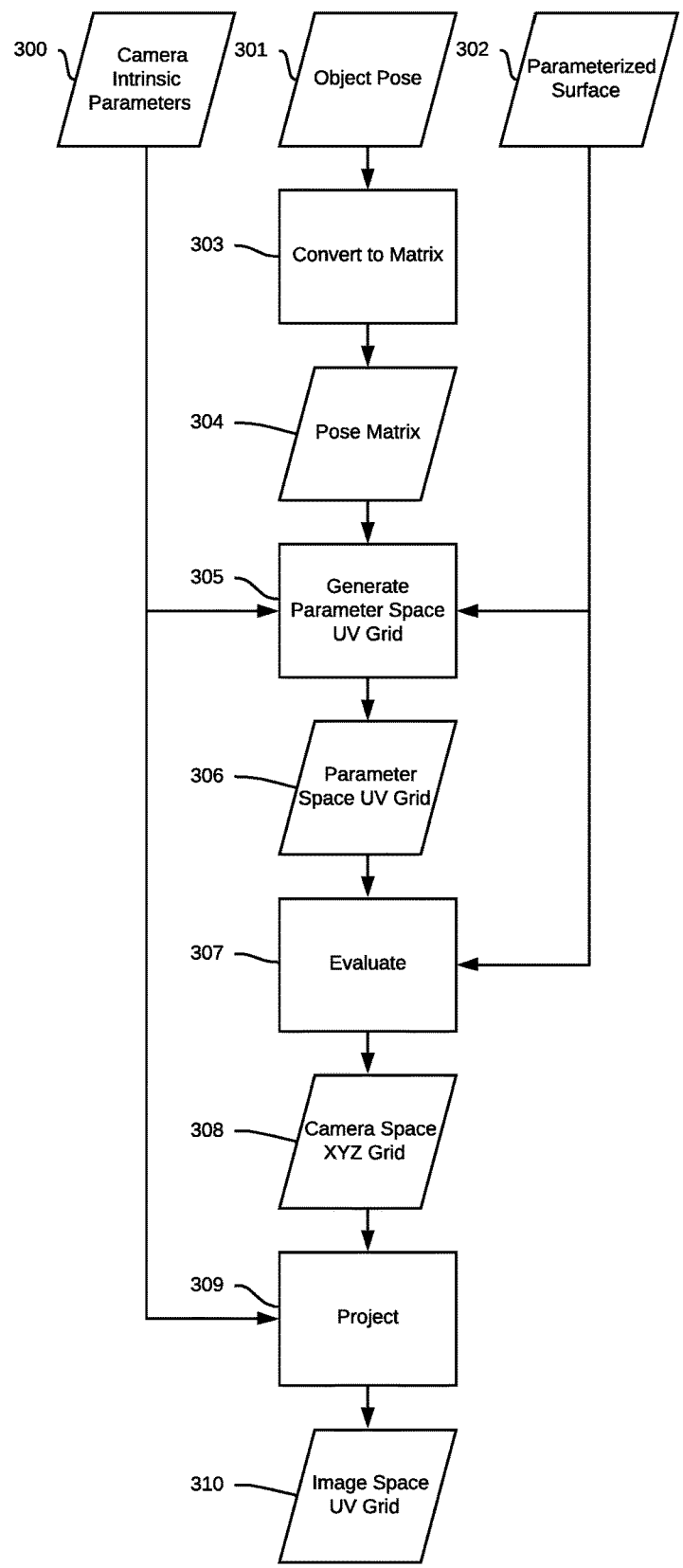
FIG. 3 is a flowchart showing details of box 208 from FIG. 2 (uv coordinate projection).

FIG. 3 shows a flowchart that further explains box 208 of FIG. 2, which is the image space grid-generation in the training process.

The inputs to the image-space grid generation are the camera intrinsic properties 300, the 3D pose of the object 301, and parameterized surface 302. Each of these are components of the image synthesis parameters (204 on FIG. 2.)

An 3D object pose 301 is converted into a pose transformation matrix 303. The pose matrix 303, as well as the parameterized surface 302 and the camera intrinsic properties 300 are used to generate a uv grid 306 in the parameter space of the object 302.

The uv grid 306 varies linearly for both values of u and v and span the entire visible range of the texture parameters in the scene. This uv range can be found in a number of ways.

In one implementation, the geometric surface 302 is trimmed by the planes of the view frustum and trimmed to only portions with normals facing the camera eye point, and also trimmed to any applied alpha mask. The range of parameterization of this visible portion of the surface is the range that is covered by our uv grid 306.

In another implementation, a plurality of rays are randomly generated within the camera's view frustum. These rays are intersected with the surface 302 to determine surface u,v parameters of the intersection points. The range of the u,v parameters contained within the alpha mask defines the range to be spanned by the uv grid 306.

In one implementation, a plurality of random u,v parameter coordinates are generated. Coordinates determined to be outside of the alpha mask are excluded. Additionally any coordinates with an associated surface normal that does not face the camera eye point, or any coordinates associated with points that project outside the camera field-of-view are also excluded. The ranges of the uv coordinates not excluded defines the range to be spanned by the uv grid 306.

Padding is added to the smaller of u or v range in order to make the u range (u-maximum−u-minimum) equal to the v range (v-maximum−v-minimum).

The uv grid 306 is structured as a two-dimensional array of uv pairs. Each row is fixed in v parameter, with the u parameter increasing linearly from u-minimum at left to u-maximum right. Each column is fixed in u, with v increasing linearly from bottom to top.

The parameterized surface 302 is then evaluated 307 with the parameters from the parameter space uv grid 307 to produce a camera space grid of 3D (xyz) coordinates 308.

This camera space grid 308 is then projected 309 via the camera intrinsic parameters 300 to produce the ideal image-space uv grid 310. This grid 310 corresponds to box 209 of FIG. 2.

Sample Applications of Use

Refilling a Prescription

A cylindrical pill bottle has information on a printed label, including the name of the patient and the prescription number for refill. Because the cylinder is not flat, OCR will not be able to read the prescription number as the text bends with the cylinder. A smart phone app captures a primary image from its camera, and that image is transmitted to random access memory of the CPU.

The CPU, potentially with use of graphics or tensor processors for acceleration, will run inference on a neural network that has been trained to recognize text on cylinders, and it produces a uv mapping grid which is interpolated to the full image resolution and then applied to original image to render a corrected image.

This corrected image can then be more easily processed with OCR (mobile or cloud based) to extract the patient name and prescription number.

Correcting an Image for Hidden Watermark Detection

A user sees a magazine advertisement that is enhanced with a Digimarc digital watermark. They use their phone to scan the image with the mobile phone, however, they hold the phone at an angle to the printed surface which without the described method would be challenging to for Digimarc's mobile app to read because the frequency domain of the image has been distorted by perspective and the curve of the page.

An enhanced version of Digimarc Discover mobile app is created that utilizes the present disclosure to first extract the flattened and distortion-corrected texture from the captured image. This image is converted to the frequency domain and searched for watermarks as described in U.S. Pat. No. 6,122,403A. A user can then scan watermarked media from wide angles of view and on curved surfaces.

Retail Scanning for Inventory or Purchase

An employee or customer scans an item which has a curved surface. An enhanced version of common UPC barcode readers or digital-watermark readers utilizes the present disclosure to first extract the flattened and distortion-corrected texture from the captured image. This improves the efficiency of scanning barcodes or digital-watermarks thereby saving time for the employee or consumer.

Machine Part Number Identification

A repair technician takes an image of a part with a curved surface or a flat surface at an angle which contains media such as a barcode or digital-watermark. The enhanced version of a common UPC barcode reader or text reader utilizes the present disclosure to first extract the flattened and distortion-corrected texture from the captured image. This improves the efficiency of scanning thereby enabling faster parts information lookup.

ID Card Scan

A security guard wishes to scan the identification of a worker, who is holding the card in his hand and causing the ID card to bend.

Using software on the phone, an image is captured of the bent card. It is then processed by the described system to produce a flat and readable version of the card. That readable version of the card can be stored in a rectangular image format for keeping, or can be scanned with OCR that runs on the phone to upload this information to a server or log the entry of the individual.

What is claimed is:

1. A method comprising:
   receiving an initial image depicting a surface displaying a texture, wherein an appearance of the texture in the initial image is distorted;
   reducing a resolution of the initial image to produce a lower resolution image;
   computing a texture mapping grid and an opacity grid by using a neural network applied to the lower resolution image;
   interpolating the texture mapping grid to construct a higher resolution texture mapping grid;
   interpolating the opacity grid to construct a higher resolution opacity grid;
   mapping pixels from the initial image to construct a corrected texture image using the higher resolution texture mapping grid;
   masking portions of the corrected texture image with the higher resolution opacity grid to construct a masked corrected texture image, and
   performing an action in relation to the masked corrected texture image.

2. The method of claim 1, wherein the surface is non-planar.

3. The method of claim 1, wherein the initial image is captured at an arbitrary angle to the surface.

4. The method of claim 1, wherein the initial image includes perspective distortion.

5. The method of claim 1, wherein the texture comprises a label on packaging.

6. The method of claim 1, wherein the texture is printed on packaging.

7. The method of claim 1, wherein the neural network has been trained with images including human readable text.

8. The method of claim 1, wherein the neural network comprises a residual neural network.

9. The method of claim 1, wherein performing the action in relation to the masked corrected texture image comprises:
   storing the masked corrected texture image.

10. The method of claim 1, wherein performing the action in relation to the masked corrected texture image comprises:
    uploading the masked corrected texture image to a server.

11. The method of claim 1, wherein performing the action in relation to the masked corrected texture image comprises:
    applying a code reading algorithm to the masked corrected texture image.

12. The method of claim 11 wherein the code reading algorithm applied to the masked corrected texture image comprises:
    extraction of hidden data within the masked corrected texture image.

13. The method of claim 11, wherein the code reading algorithm applied to the masked corrected texture image comprises:
    decoding a hidden digital watermark within the masked corrected texture image.

14. The method of claim 11, wherein the code reading algorithm applied to the masked corrected texture image comprises:
    decoding a barcode within the masked corrected texture image.

15. The method of claim 11, wherein the code reading algorithm applied to the masked corrected texture image comprises:
    reading of text on the masked corrected texture image.

16. The method of claim 15, wherein the reading of text on the masked corrected texture image comprises:
    optical character recognition.

17. The method of claim 1, wherein the surface is one of a cylindrical pill bottle, a curved ID card, or a magazine page.

18. The method of claim 1, wherein the surface is the cylindrical pill bottle, and
    the action in relation to the masked corrected texture image is extracting a prescription number or patient name from the masked corrected texture image.

* * * * *